(12) United States Patent
Leiffheit et al.

(10) Patent No.: US 7,434,836 B2
(45) Date of Patent: Oct. 14, 2008

(54) AIRBAG MODULE

(75) Inventors: Markus Leiffheit, Biberbach/Affalten (DE); Heinrich Einsiedel, Ulm (DE); Richard Frank, Elchingen (DE); Ulrich Karlbauer, Ulm (DE)

(73) Assignee: Takata-Petri AG, Aschaffenburg (DE)

( * ) Notice: Subject to any disclaimer, the term of this patent is extended or adjusted under 35 U.S.C. 154(b) by 0 days.

(21) Appl. No.: 11/709,292

(22) Filed: Feb. 22, 2007

(65) Prior Publication Data

US 2007/0200328 A1    Aug. 30, 2007

Related U.S. Application Data

(63) Continuation of application No. PCT/DE2005/001433, filed on Aug. 10, 2005.

(30) Foreign Application Priority Data

Aug. 24, 2004 (DE) .................. 10 2004 041 802

(51) Int. Cl.
B60R 21/26 (2006.01)
(52) U.S. Cl. ....................................... 280/740
(58) Field of Classification Search ............. 280/730.2, 280/736, 740, 742
See application file for complete search history.

(56) References Cited

U.S. PATENT DOCUMENTS

| 4,275,901 | A | 6/1981 | Okada |
| 5,683,102 | A | 11/1997 | Davis et al. |
| 5,718,447 | A | 2/1998 | Rose et al. |
| 5,738,372 | A | 4/1998 | Lowe et al. |
| 6,308,984 | B1 | 10/2001 | Fischer |
| 6,502,857 | B2 * | 1/2003 | Nakanishi et al. ............ 280/740 |
| 6,783,148 | B2 * | 8/2004 | Henderson ................ 280/728.2 |
| 2004/0113400 | A1 * | 6/2004 | Weber ....................... 280/730.2 |
| 2004/0140655 | A1 | 7/2004 | Henning et al. |
| 2004/0239082 | A1 * | 12/2004 | Schneider et al. ......... 280/730.1 |
| 2005/0179240 | A1 | 8/2005 | Duvacquier et al. |
| 2006/0038388 | A1 | 2/2006 | Einsiedel |
| 2006/0043714 | A1 * | 3/2006 | Mramor et al. .............. 280/736 |

FOREIGN PATENT DOCUMENTS

| DE | 100 20 796 A1 | 12/2000 |
| DE | 202 10 948 U 1 | 11/2002 |
| DE | 203 00 500 U1 | 6/2003 |
| DE | 102 21 659 A1 | 8/2003 |
| DE | 203 03 115 U 1 | 11/2003 |
| EP | 0 800 960 A2 | 10/1997 |
| EP | 0 807 557 A1 | 11/1997 |
| WO | WO 00/69690 | 11/2000 |
| WO | WO 03/070527 A1 | 8/2003 |

* cited by examiner

*Primary Examiner*—Christopher Ellis
*Assistant Examiner*—Robert A. Coker
(74) *Attorney, Agent, or Firm*—Foley & Lardner LLP

(57) ABSTRACT

An airbag module comprises a gas generator, a gas bag, and a gas guiding device which is connected to the gas bag and the gas generator. The gas guiding device comprises at least one outflow opening, through which the gas of the gas generator in the gas bag is guided. The airbag module will not be damaged or only slightly damaged if the airbag module is externally heated, for example, in a fire. The airbag module is configured such that if the gas generator is undesirably released, if the generator is externally heated, the airbag module is thrust-neutral.

19 Claims, 6 Drawing Sheets

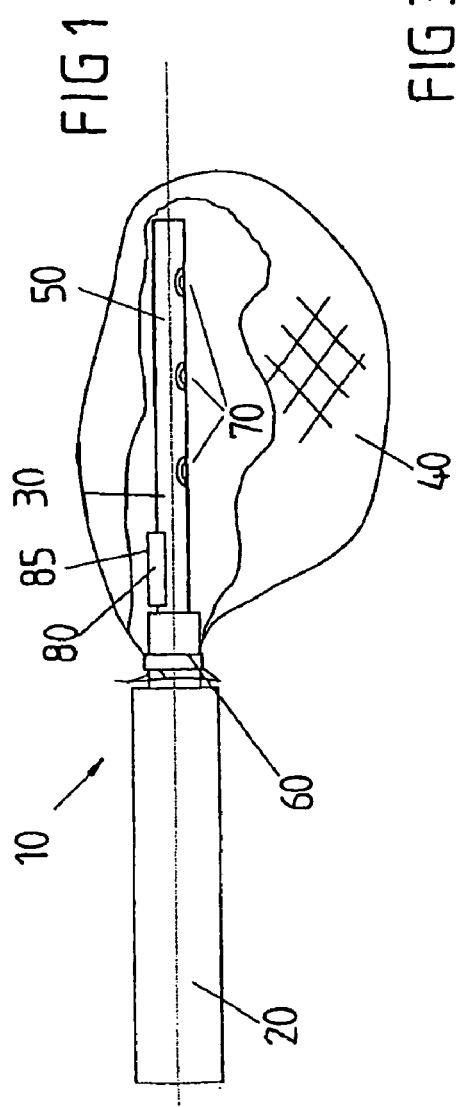
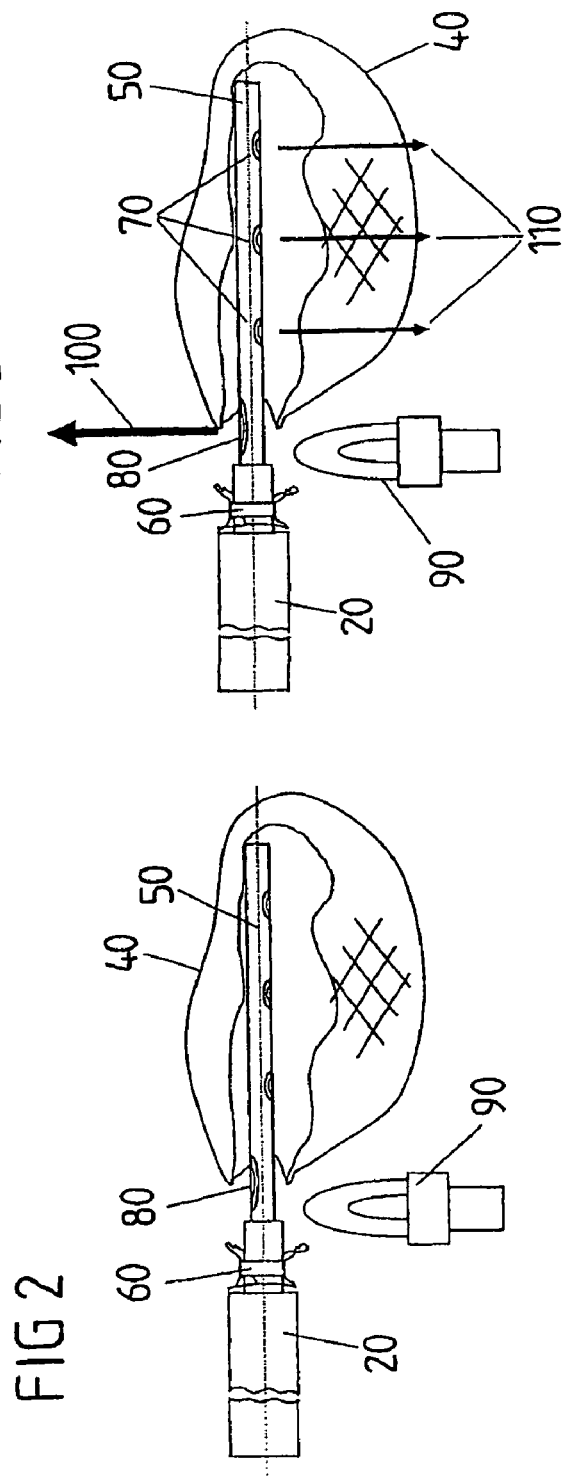

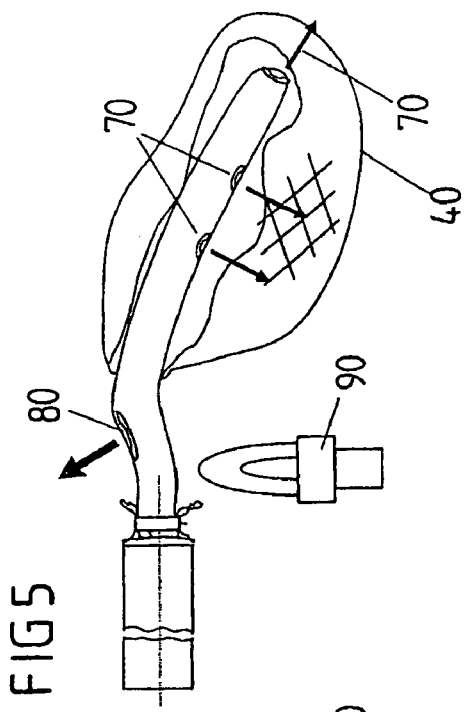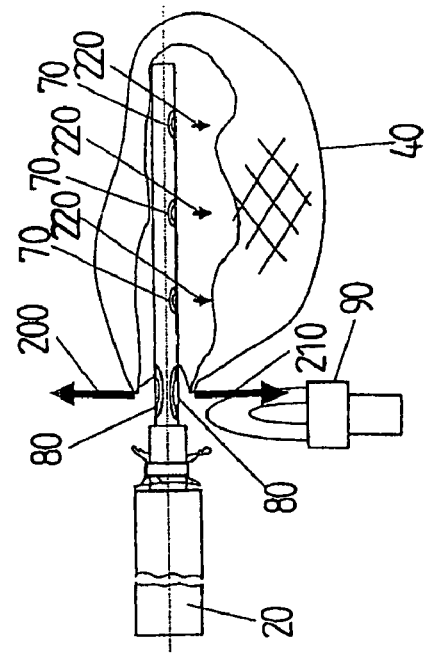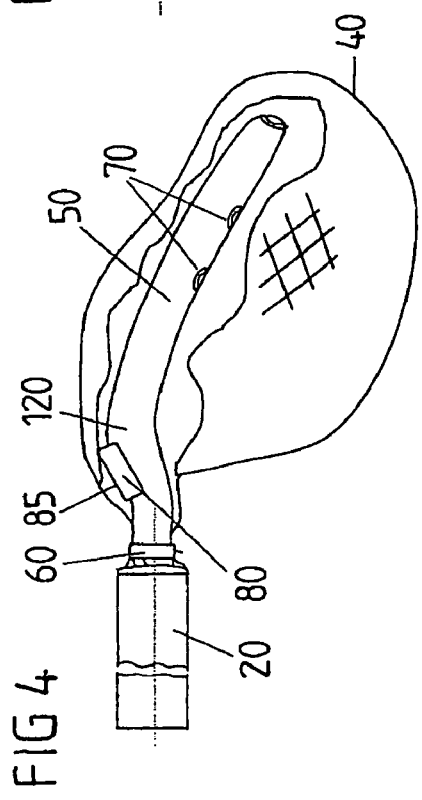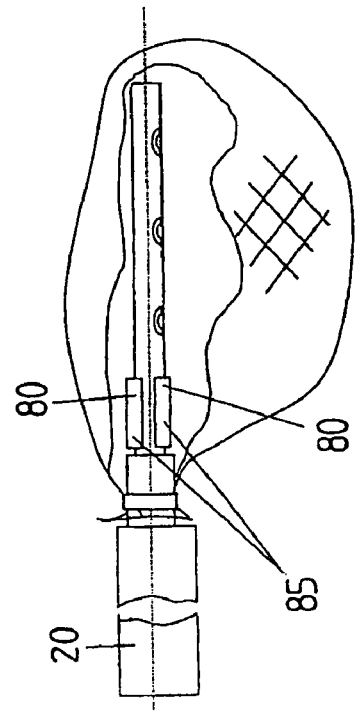

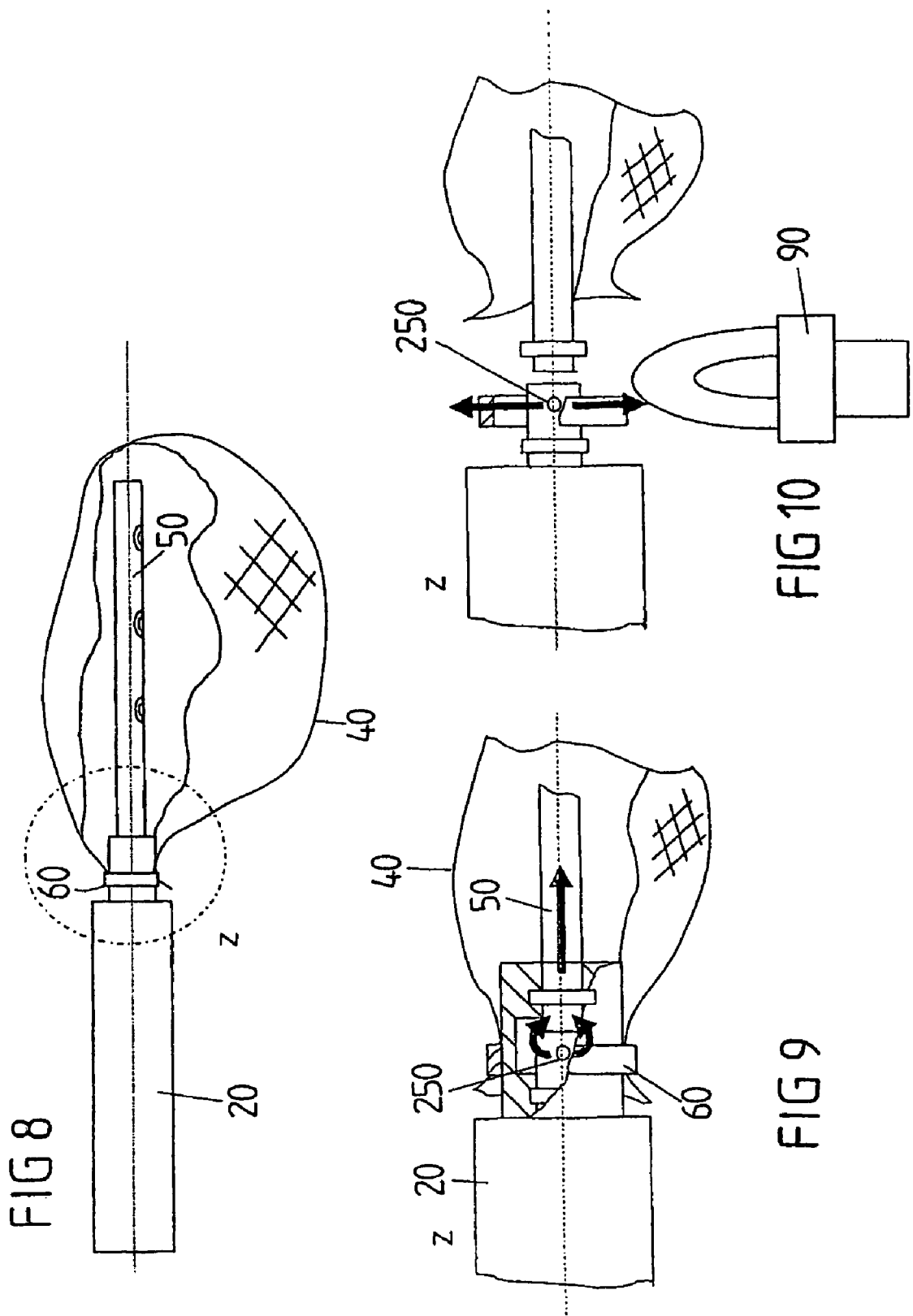

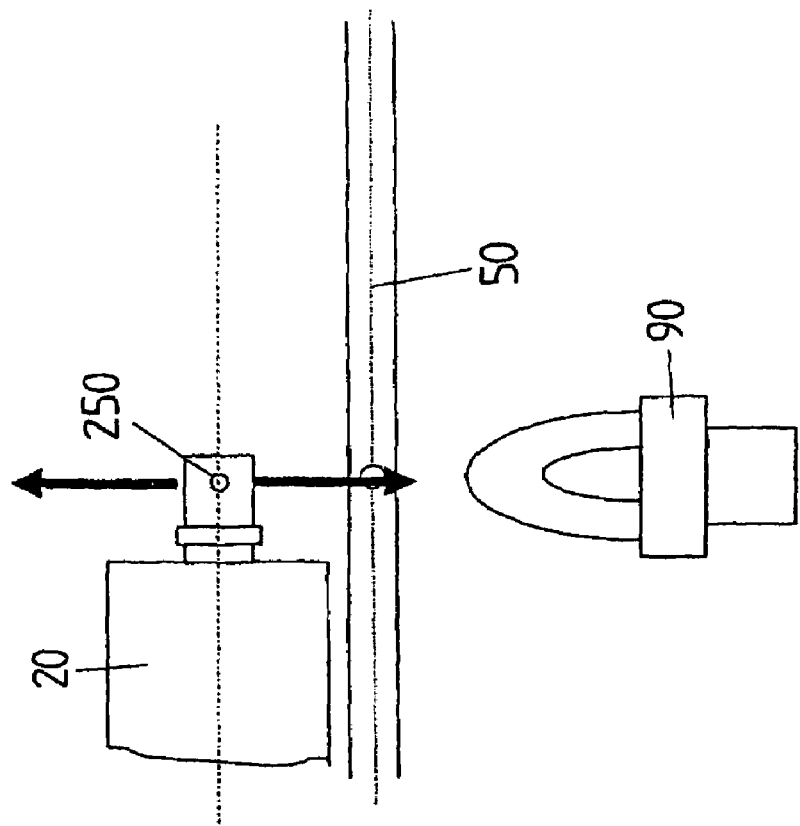
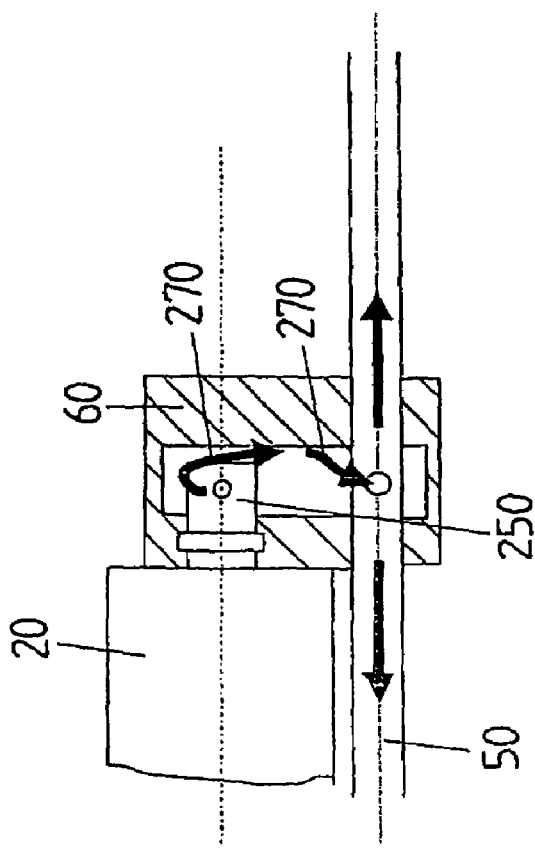

AIRBAG MODULE

CROSS-REFERENCE TO RELATED PATENT APPLICATIONS

This application is a continuation of International Application PCT/DE 2005/001433, which has an international filing date of Aug. 10, 2005 and which was published in German as WO 2006/021189, both of which are incorporated by reference herein in their entireties.

BACKGROUND

The invention relates to an airbag module.

An airbag module is known, for example, from utility model specification DE 203 03 115.6, which is incorporated by reference herein in its entirety. This previously known airbag module has a gas generator which is connected to an airbag by means of a gas-conducting device. The gas-conducting device is formed by a gas lance. The gas lance has a multiplicity of outflow openings through which the gas flowing out of the gas generator is conducted into the airbag of the airbag module.

The gas generator of the previously known airbag module, which therefore forms a subcomponent of the airbag module, is inherently thrust-neutral in the noninstalled state, i.e. before connection to the gas-conducting device. This means that, when gas exits from the gas generator, the recoil force of the emerging gas cannot exert a resulting driving force on the gas generator, moving the gas generator, because the gas outlet holes of the gas generator are namely arranged in such a manner that the recoil forces in their sum total cancel one another out. Specifically, the gas outlet holes of the gas generator are arranged opposite one another for this purpose.

Airbag modules with additional gas outlet openings which may melt open in the event of a fire are described, for example in U.S. Pat. Nos. 5,683,102 and 5,738,372 (which are incorporated by reference herein in their entirety); however, these airbag modules are not thrust-neutral.

SUMMARY

One exemplary embodiment relates to an airbag module. The airbag module comprises a gas generator, an airbag, and a gas-conducting device connecting the airbag and the gas generator. The gas-conducting device includes at least one outflow opening through which gas of the gas generator is conducted into the airbag. The airbag module is configured such that, in an event of undesired triggering of the gas generator due to external heating, the airbag module behaves in a thrust-neutral manner, or at least approximately in a thrust-neutral manner. The gas-conducting device is in the form of a gas lance and projects into the airbag. Both of the at least one outflow opening and at least one additional gas outlet opening are located in the gas lance. The at least one additional gas outlet opening is provided in such a manner that, in the event of external heating, thrust action of the gas emerging from the at least one additional gas outlet opening at least approximately neutralizes the thrust action of the gas emerging from the at least one outflow opening.

Another exemplary embodiment provides an airbag module. The airbag module comprises a gas generator, an airbag, and a gas-conducting device connecting the airbag and the gas generator. The gas-conducting device includes at least one outflow opening through which gas from the gas generator passes into the airbag and an additional outflow opening. The additional outflow opening is initially covered by a closure element. The closure element melts due to external heating to uncover the additional outflow opening. The airbag module is configured such that in an event of an undesired triggering of the gas generator due to external heating, the airbag module behaves in a thrust-neutral manner.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

FIG. 1 illustrates an airbag module according to a first embodiment.

FIG. 2 illustrates the airbag module of FIG. 1 in which a closure element has melted.

FIG. 3 illustrates the airbag module of FIG. 1 in which gas discharging directions of gas from a gas generator are shown.

FIG. 4 illustrates an airbag module according to a second embodiment.

FIG. 5 illustrates the airbag module of FIG. 4 in which gas discharging directions of gas from the gas generator are shown.

FIG. 6 illustrates an airbag module according to a third embodiment.

FIG. 7 illustrates the airbag module of FIG. 6 in which gas discharging directions of gas from the gas generator are shown.

FIG. 8 illustrates an airbag module according to a fourth embodiment.

FIG. 9 illustrates a detail view of a connecting element of the airbag module of FIG. 8.

FIG. 10 illustrates the airbag module of FIG. 8 in which gas discharging directions of gas from the gas generator are shown.

FIG. 11 illustrates an airbag module according to a fifth embodiment.

FIG. 12 illustrates the airbag module of FIG. 11 in which gas discharging directions of gas from the gas generator are shown.

DETAILED DESCRIPTION

Figure 13:
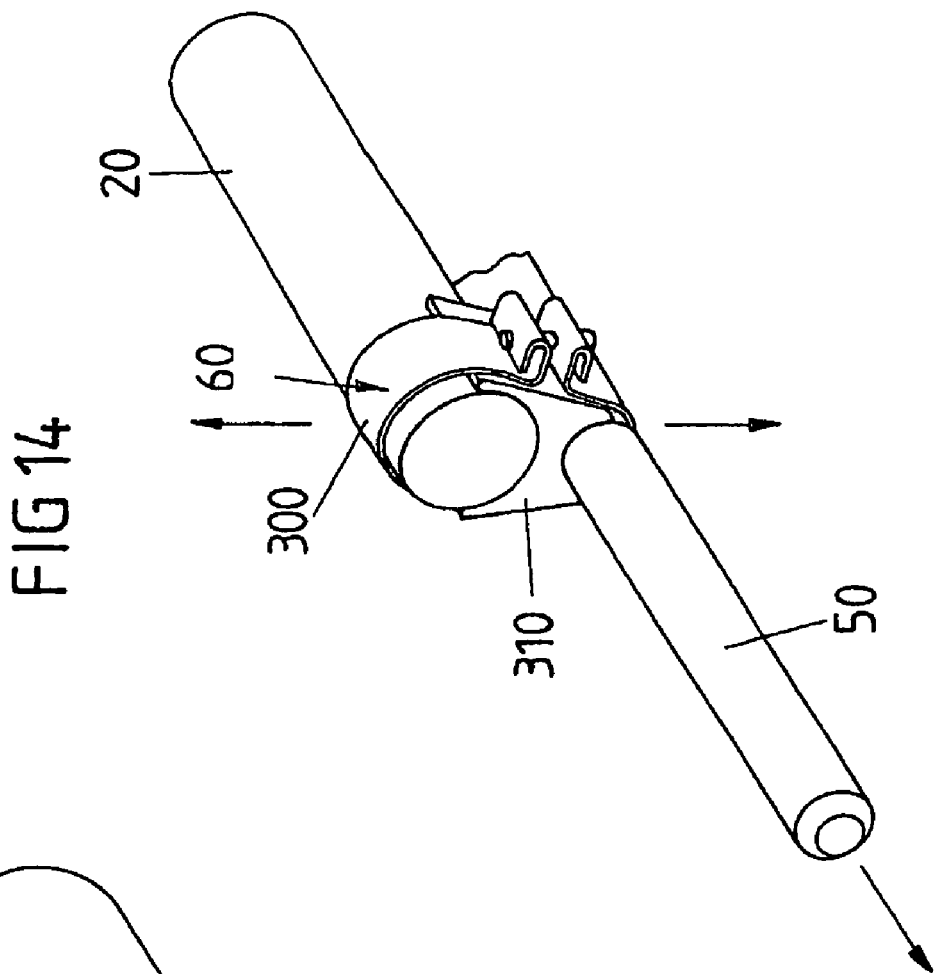
FIG. 13 illustrates an airbag module according to a sixth embodiment.

An object is to provide an airbag module which prevents accidents during the handling of an airbag module. In particular, in the event of external heating of the airbag module, for example in the event of a fire, the airbag module is not to pose any risk or at least only the smallest possible risk.

According thereto, exemplary embodiments make provision for the airbag module to be configured in such a manner that, in the event of an undesired triggering of the gas generator caused by external heating, in particular in the event of a fire, the airbag module behaves in a thrust-neutral manner, or at least approximately behaves in a thrust-neutral manner.

A possible substantial advantage of the airbag module according to embodiments is that, in the event of an undesired triggering of the gas generator by external heating, said airbag module cannot generate any thrust action and therefore cannot move in an uncontrolled manner as a "hazardous projectile" and hence put people at risk or "fly through the surroundings". This can be achieved, according to embodiments by the airbag module—in the event of a triggering of the gas generator caused in an undesired manner by means of thermal action—behaving in a thrust-neutral manner as "a whole". In contrast, for example, to the previously known airbag module described at the beginning, in which, although a thrust-neutral gas generator is used, on the whole a thrust-neutral overall module is not realized, the airbag module according to embodiments behaves on the whole in a thrust-neutral manner if there is a thermally caused triggering of the gas generator.

The thrust-neutral behavior of the airbag module can be achieved in a particularly simple and therefore advantageous manner if the gas-conducting device is thermally unstable in such a manner that, during external heating, in particular in the event of a fire, the gas flow is caused to be conducted out of the gas generator in a manner free from thrust. For example, during external heating, the gas-conducting device can partially or completely melt open, so that the gas can escape directly from the preferably thrust-neutral gas generator.

Alternatively, the gas-conducting device can have at least one additional gas outlet opening which is closed during normal operation and which, only during external heating, in particular in the event of a fire, melts open and additionally allows the gas of the gas generator to escape.

This at least one additional gas outlet opening preferably has a gas discharging direction which is opposed to the gas discharging direction of the at least one "normal" outflow opening of the gas-conducting device. It is therefore ensured that, when the additional gas outlet opening is melted open, an additional gas flow is made possible, the thrust action of which is opposed to the thrust action caused by the "normal" outflow opening of the gas-conducting device and the action of which is therefore reduced or ideally is canceled out. The cross section of the at least one additional gas outlet opening is preferably dimensioned in such a manner that the desired "counter thrust action" is obtained.

According to another embodiment of the airbag module, it is provided that the gas-conducting device has at least two additional gas outlet openings which are closed during normal operation and which, only during external heating, in particular in the event of a fire, melt open and additionally allow the gas of the gas generator to escape. In this case, the two additional gas outlet openings have opposed gas discharging directions, so that the additional thrust effect caused by each of the two gas outlet openings is canceled out. This thrust-neutral arrangement of the two additional gas outlet openings can be achieved, for example, by them being arranged spatially opposite each other.

The two additional gas outlet openings preferably conduct away a substantial part of the gas flow of the gas generator, so that it is ensured that the "normal" outflow openings of the gas-conducting device cannot cause any hazardous residual thrust action. The at least two additional gas outlet openings preferably conduct away at least 50% of the gas flow, preferably even 90% of the gas flow. The desired conducting-away action can be set by the size of the additional gas outlet openings; the larger the additional gas outlet openings are, the smaller is the influence of the "normal" outflow openings and therefore their residual thrust action.

According to another embodiment of the airbag module, it is provided that a connecting element of the gas-conducting device connects the gas generator to the gas-conducting device. This connecting element is preferably thermally unstable in such a manner that, during external heating, in particular in the event of a fire, it interrupts the flow connection between the gas generator and the gas-conducting device and therefore carries away the gas leaving the gas generator directly to the outside. During the external heating mentioned, the connecting element can, for example, entirely or partially melt open.

The gas generator is preferably likewise configured to be thrust-neutral by itself, so that, if the gas generator is separated from the gas-conducting device, it likewise cannot deploy any residual thrust action.

It is considered particularly preferable if the gas generator has two or more outflow openings arranged in a radially symmetrical manner—for example two opposite outflow openings, of which one is connected to the gas-conducting device by the connecting element and of which the other is closed by the connecting element. In the event of external heating of the connecting element, the latter will melt open, so that both outflow openings of the gas generator are exposed and the gas of the gas generator can leave the gas generator in a manner free from thrust action.

The gas-conducting device and/or the connecting element may comprise, for example, a tube which is thermally unstable in such a manner that, during external heating, in particular in the event of a fire, it entirely or partially melts open and causes the gas flow to be conducted out of the gas generator in a manner free from thrust. The tube can be held, for example, by a clip.

A particularly simple installation of the tube can be achieved if the tube is formed by a heat-shrinking tube. The term "heat-shrinking tube" is to be understood here as meaning tubes which, in the event of heating, reduce their tube diameter and therefore, for fastening, can be "shrunk" onto pipes or the like.

The heat-shrinking tube is preferably shrunk onto at least one additional gas outlet opening of the gas-conducting device, so that it closes said opening; during external heating, in particular in the event of a fire, the tube melts open, so that the gas of the gas generator can discharge through the additional gas outlet opening.

If the heat-shrinking tube forms the connecting element or a part thereof, then the heat-shrinking tube is preferably shrunk at least onto a section of the gas lance of the gas-conducting device and/or onto a section of the gas generator.

The tube or the heat-shrinking tube preferably has a wall thickness of 2 to 5 mm in order to be able to apply sufficient counterforce to the gas pressure exerted by the gas generator; however, other wall thicknesses may also be suitable in individual cases. The heat-shrinking tube can be composed of, for example, cross-linked polyolefin.

The term "gas-conducting device" is moreover to be understood quite generally: gas-conducting devices may comprise, for example, long or short pipes, gas lances of any type, diffusers of any type, pipes with diffusers of any type flanged onto them or other types of gas lines or may be formed by components of this type.

In the Figures, the same reference numbers are used for identical or comparable elements.

FIG. 1 shows an airbag module 10 with a gas generator 20 which is connected to an airbag 40 via a gas-conducting device 30. The gas-conducting device 30 has a gas lance 50 and connecting element 60 which connects the gas lance 50 to the gas generator 20 and to the airbag 40.

As can be seen in FIG. 1, the gas lance 50 has a multiplicity of outflow openings 70 through which the gas discharging from the gas generator 20 is conducted into the airbag 40.

In addition, an additional gas outlet opening 80 can be seen in FIG. 1, but said gas outlet opening is initially closed by a closure element 85 which can be melted open. No gas can therefore initially emerge through this additional gas outlet opening 80.

If external heating of the airbag module 10 occurs, for example in the event of a fire—this is symbolized in FIG. 2 by a flame 90—then the additional gas outlet opening 80 will open, since the closure element 85 is thermally unstable and melts. Gas of the gas generator 20 can therefore also emerge through this additional gas outlet opening 80.

As can be seen in FIG. 2, the starting point of the exemplary embodiment according to FIGS. 1 to 3 is that the airbag 40 melts open during appropriate thermal action, so that the additional gas outlet opening 80 is released and a direct discharging of the gas emerging from the gas generator 20 through the additional gas outlet opening 80 is made possible.

In FIG. 3, the gas discharging direction of the gas emerging from the additional gas outlet opening 80 is identified by the reference number 100. The gas discharging directions of the gas emerging from the gas lance 50 from the "normal" outflow openings 70 are identified by the reference number 110.

It can be seen in FIG. 3 that the gas discharging direction 100 of the gas emerging from the additional gas outlet opening 80 runs in an opposed manner to the gas discharging directions 110 of the outflow opening 70. The overall behavior of the airbag module 10 is therefore "thrust-neutral", since the thrust action of the gas emerging from the additional gas outlet opening 80 is of approximately the same magnitude as the thrust action of the gas emerging from the outflow openings 70. For this purpose, the cross section of the additional gas outlet opening 80 is dimensioned in such a manner that the gas flow from the additional gas outlet opening 80 approximately corresponds to the gas flow which flows out of the outflow openings 70.

Moreover, it does not matter in the exemplary embodiment according to FIGS. 1 to 3 whether the gas generator 20 is or is not thrust-neutral on its own, since the thrust neutrality of the airbag module 10 is namely ensured solely by the additional gas outlet opening 80.

FIGS. 4 and 5 show a second exemplary embodiment of an airbag module. In contrast to the exemplary embodiment according to FIGS. 1 to 3, in this second exemplary embodiment the gas lance 50 is not designed rectilinearly but rather curved. In order nevertheless to achieve the effect of the airbag module 10 behaving approximately in a thrust-neutral manner in the event of a fire, the additional gas outlet opening 80, which is initially closed by a closure element 85 which can be melted open, is provided in a curved region 120 of the gas lance 50 in such a manner that, in spite of the nonrectilinear profile of the gas lance 50, the thrust action of the gas emerging from the additional gas outlet opening 80 approximately "neutralizes" the thrust action of the gas emerging from the outflow openings 70.

FIGS. 6 and 7 show a third exemplary embodiment of an airbag module. It can be seen that two additional gas outlet openings 80 are arranged on the gas lance 50, which gas outlet openings are spatially opposite each other and are dimensioned in such a manner that most of the gas emerging from the gas generator 20 emerges through these two additional gas outlet openings 80 as soon as, in the event of a fire, the closure elements 85 which can be melted open melt open and release the two gas outlet openings 80.

since the two additional gas outlet openings 80 are opposite each other, the thrust action of the gas leaving the two gas outlet openings is neutralized, thus approximately forming a thrust-neutral or thrust-free airbag module.

In the exemplary embodiment according to FIGS. 6 and 7, it is therefore insignificant whether the gas generator 20 is or is not thrust-neutral by itself, since the thrust neutrality of the airbag 10 is namely ensured solely by the additional gas outlet openings 80.

FIG. 7 schematically illustrates by means of arrows 200, 210 and 220 that the gas flow through the two additional gas outlet openings 80 is significantly larger than the gas flow through the outflow openings 70, with the result that these last-mentioned openings cannot cause any substantial residual thrust action.

In conjunction with FIGS. 8 to 10, a fourth exemplary embodiment of an airbag module is now explained. The internal construction of the connecting element 60 can be seen in detail in particular in FIG. 9. In this case, the connecting element 60 is configured in a thermally unstable manner, so that, during heating in the event of a fire, it melts open and releases two opposite outflow openings 250 of the gas generator 20. The gas discharging from the gas generator 20 will therefore discharge directly from the outflow openings 250 of the gas generator 20 and cannot pass into the gas-conducting device 30. Since the gas generator 20 is configured in a thrust-neutral manner, it is therefore ensured in the event of a fire that the entire airbag module 10 also behaves in a thrust-neutral manner.

FIGS. 11 and 12 show a fifth exemplary embodiment of an airbag module. In the case of this airbag module, there is likewise a thermally unstable connecting element 60 which melts open in the event of a fire and makes it possible for the gas coming from the gas generator 20 to directly emerge through the outflow openings 250 of the gas generator 20. As a result of the fact that the gas generator 20, as already mentioned, is configured in a thrust-neutral manner, a thrust neutrality of the entire airbag module 10 is ensured in the event of a fire. Arrows 270 indicate the gas flow through the connecting element 60 during normal operation, i.e. before the connecting element 60 is melted open.

In conjunction with FIGS. 13 and 14, a sixth exemplary embodiment of an airbag module is explained below. A thrust-neutral gas generator 20 with its two opposite outflow openings 250 can be seen in FIG. 13.

Figure 14:
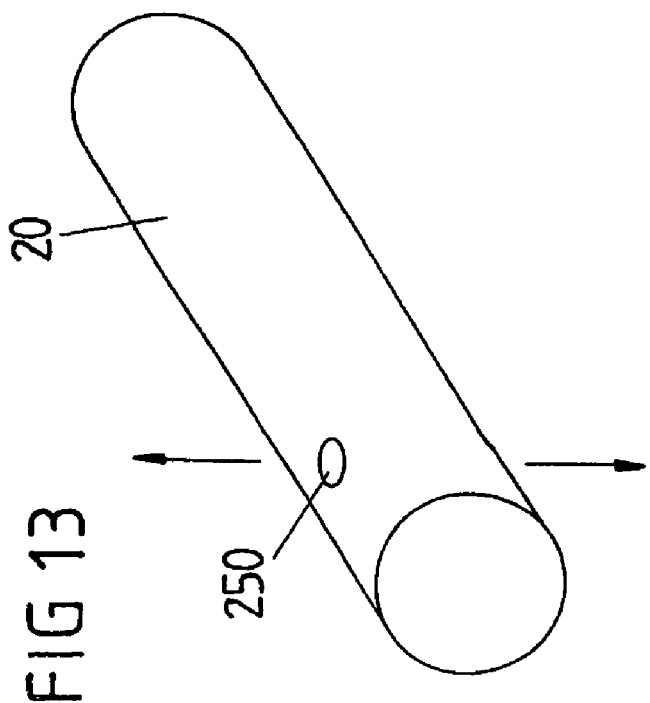
FIG. 14 illustrates the connecting element of the airbag module of FIG. 13.

FIG. 14 shows the gas generator 20 and the gas lance 50 in detail. It can be seen that the connecting element 60 is formed by a thermally stable or thermally unstable tightening strap 300 and a thermally unstable connecting member 310. The tightening strap 300 covers one of the two outflow openings 250 of the gas generator and presses the opposite outflow opening against the connecting member 310 in such a manner that the gas of the gas generator 20 is conducted through a gas passage (not shown specifically) in the connecting member 310 into the gas lance 50.

The thermally unstable connecting member 310 will melt open in the event of a fire, so that the fixed connection between the gas generator 20 and the gas lance 50 is undone. By this means, the two opposite outflow openings 250 of the gas generator 20 are exposed, so that the gas can emerge directly out of the thrust-neutral gas generator 20.

The closure elements 85 which can be melted open, according to FIGS. 1 to 7, can be, for example, a tube, for example a heat-shrinking tube. Suitable heat-shrinking tubes are sold, for example, by DSG Canusa under the product name "CFW". A corresponding exemplary embodiment is shown in FIG. 15.

Figure 15:
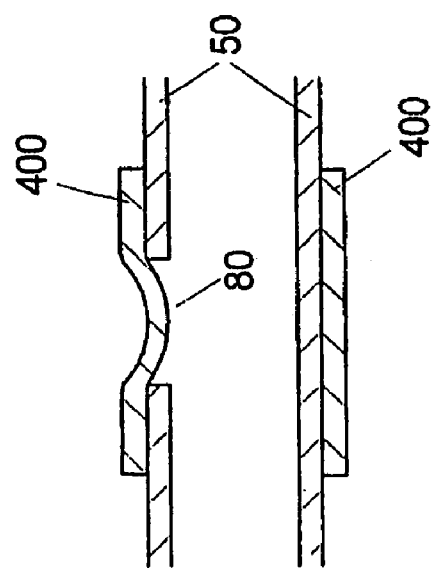
FIG. 15 is a cross-sectional view of a gas lance for an airbag module with a heat shrinking tube according to another embodiment.

FIG. 15 shows, in cross section, a heat-shrinking tube 400 which is shrunk onto an additional outflow opening 80 of a gas lance, a diffuser or a pipe with a diffuser flanged onto it or the like—cf. reference number 50—and closes said outflow opening during normal operation. In the event of a fire, the heat-shrinking tube 400 melts open and releases the additional outflow opening 80, so that a thrust-neutral behavior of the airbag module 10 is caused.

Figure 16:
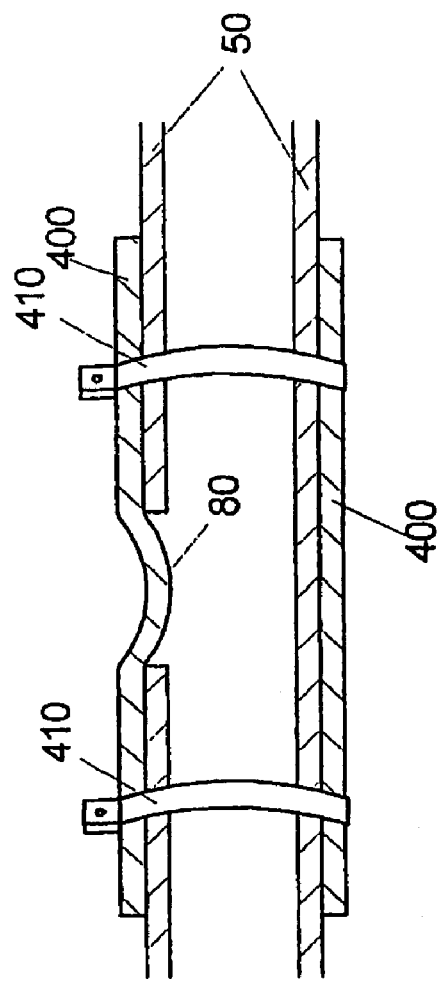
FIG. 16 is a cross-sectional view of a gas lance for an airbag module with a heat shrinking tube according to another embodiment.

In addition, the heat-shrinking tube 400 can also be held by clips 410; FIG. 16 shows a corresponding exemplary embodiment.

Alternatively, it is likewise possible to form the closure element 85 by means of a normal tube which does not have any heat-shrinking properties. A tube of this type can be held, for example—as has been shown in FIG. 16 using the example of a heat-shrinking tube—by clips 410.

Furthermore, even a connecting element (not illustrated in FIGS. 15 and 16) between the gas generator 20 and the gas lance, the diffuser or the pipe with the diffuser flanged onto it—cf. reference number 50—can be formed by a tube, for example a heat-shrinking tube. With regard to the manner of operation of such a "connecting element which can be melted open", reference is made to the exemplary embodiments according to FIGS. 8 to 14.

The German Priority Application DE 10 2004 041 802.0, filed Aug. 24, 2004, including the specification, drawings, claims and abstract, is incorporated herein by reference in its entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. An airbag module, comprising:
    a gas generator;
    an airbag; and
    a gas-conducting device connecting the airbag and the gas generator, the gas-conducting device including at least one outflow opening through which gas of the gas generator is conducted into the airbag,
    wherein the airbag module being configured such that, in an event of undesired triggering of the gas generator due to external heating, the airbag module behaves in a thrust-neutral manner, or at least approximately in a thrust-neutral manner,
    wherein the gas-conducting device is in the form of a gas lance and projects into the airbag,
    wherein both at least one outflow opening and at least one additional gas outlet opening are located in the gas lance, and
    wherein the at least one additional gas outlet opening is provided in such a manner that, only in the event of undesired external heating, thrust action of the gas emerging from the at least one additional gas outlet opening at least approximately neutralizes the thrust action of the gas emerging from the at least one outflow opening.

2. The airbag module as claimed in claim 1, wherein the at least one additional gas outlet opening is closed during normal operation and, during external heating, melts open and additionally allows gas of the gas generator to discharge.

3. The airbag module as claimed in claim 2, wherein the at least one additional gas outlet opening has a gas discharging direction which is opposed to the gas discharging direction of the at least one outflow opening.

4. The airbag module as claimed in claim 1, wherein, during normal operation, the at least one additional gas outlet opening is closed by a thermally unstable tube which, during external heating, melts open.

5. The airbag module as claimed in claim 4, wherein the tube is held by at least one clip.

6. The airbag module as claimed in claim 4, wherein the tube is formed by a heat-shrinking tube.

7. The airbag module as claimed in claim 6, wherein the heat-shrinking tube is shrunk onto the at least one additional gas outlet opening of the gas-conducting device and closes said opening, and during external heating, the heat-shrinking tube melts open and additionally allows the gas of the gas generator to discharge.

8. The airbag module as claimed in claim 1, wherein the gas generator is configured in a thrust-neutral manner.

9. The airbag module as claimed in claim 1, further comprising a second additional gas outlet opening spatially opposite the at least one additional gas outlet.

10. The airbag module as claimed in claim 1, wherein the airbag melts during the undesired external heating.

11. The airbag module as claimed in claim 1, wherein the airbag covers the at least one additional gas outlet prior to the undesired external heating.

12. An airbag module, comprising:
    a gas generator;
    an airbag; and
    a gas-conducting device connecting the airbag and the gas generator, the gas-conducting device including at least one outflow opening through which gas from the gas generator passes into the airbag and an additional outflow opening,
    wherein the additional outflow opening is initially covered by a closure element, the closure element melts only due to undesired external heating to uncover the additional outflow opening, and
    wherein the airbag module is configured such that in an event of an undesired triggering of the gas generator due to external heating, the airbag module behaves in a thrust-neutral manner.

13. The airbag module as claimed in claim 12, wherein the gas-conducting device is in the form of a gas lance and projects into the airbag.

14. The airbag module as claimed in claim 12, wherein the at least one additional gas outlet opening is provided in such a manner that, in the event of external heating, thrust action of the gas emerging from the at least one additional gas outlet opening at least approximately neutralizes the thrust action of the gas emerging from the at least one outflow opening.

15. The airbag module as claimed in claim 12, wherein the at least one additional gas outlet opening has a gas discharging direction which is opposed to the gas discharging direction of the at least one outflow opening.

16. The airbag module as claimed in claim 12, wherein the closure element is a thermally unstable tube which, during external heating, melts open.

17. The airbag module as claimed in claim 16, wherein the tube is held by at least one clip.

18. The airbag module as claimed in claim 16, wherein the tube is formed by a heat-shrinking tube.

19. The airbag module as claimed in claim 18, wherein the heat-shrinking tube is shrunk onto the at least one additional gas outlet opening of the gas-conducting device and closes said opening, and during external heating, the heat-shrinking tube melts open and additionally allows the gas of the gas generator to discharge.

* * * * *